United States Patent [19]
Liou

[11] Patent Number: 5,626,946
[45] Date of Patent: May 6, 1997

[54] FLEXIBLE AND PERMEABLE SHEET

[76] Inventor: Ding-Yuh Liou, No. 4, Lane 429, Lu Shan Rd., Chu Shan Jenn, Nan Tou Hsien, Taiwan

[21] Appl. No.: 518,593

[22] Filed: Aug. 11, 1995

[51] Int. Cl.$^6$ ...................................................... B32B 3/00
[52] U.S. Cl. ........................... 428/195; 428/196; 427/288
[58] Field of Search ................................... 428/195, 196; 427/288

[56] References Cited

U.S. PATENT DOCUMENTS

5,055,340  10/1991  Matsumura et al. ...................... 428/172

*Primary Examiner*—Christopher Raimund
*Attorney, Agent, or Firm*—Bacon & Thomas

[57] ABSTRACT

The invention relates to a sheet material having an upper surface and a lower surface comprising a net of fibers having plastic beaded bodies integrally molded therein such that the upper surface of the material has discrete elevated portions and the lower surface of the material is flat. A process for the preparation of the sheet material is also disclosed.

14 Claims, 8 Drawing Sheets

FLEXIBLE AND PERMEABLE SHEET

The present invention relates to a novel sheet material which differs from conventional sheet material devices, and particularly to a flexible and permeable sheet material. The sheet material appears elevational, and is flexible and permeable. The sheet material is quickly formed and integrated with beads, is strong and has applications in a wide variety of products. The sheet material increases the practical use and handsome appearance of products.

The sheet material is a kind of sheet or band material used as the raw material for making a product, such as artificial skins, leather, styro plate of shoe pads, cloth, bamboo shoots, rattan sheets, etc. It is understood that the known sheet materials have such defects as impermeability or inflexibility. The known sheet materials are all flat, lack a massaging effect, and have a dull and boring appearance.

Figure 1A:
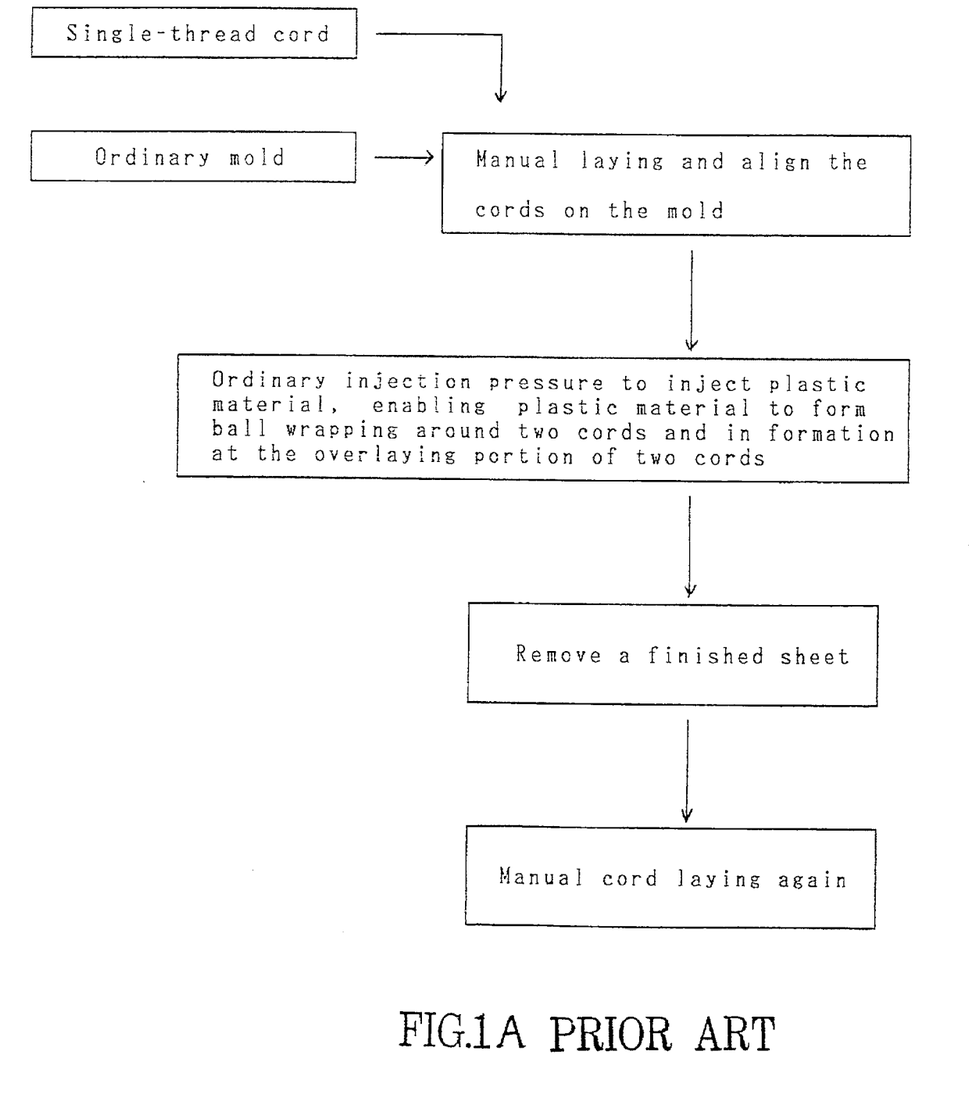
FIG. 1A is a manufacturing process block diagram of the conventional type.
Figure 1B:
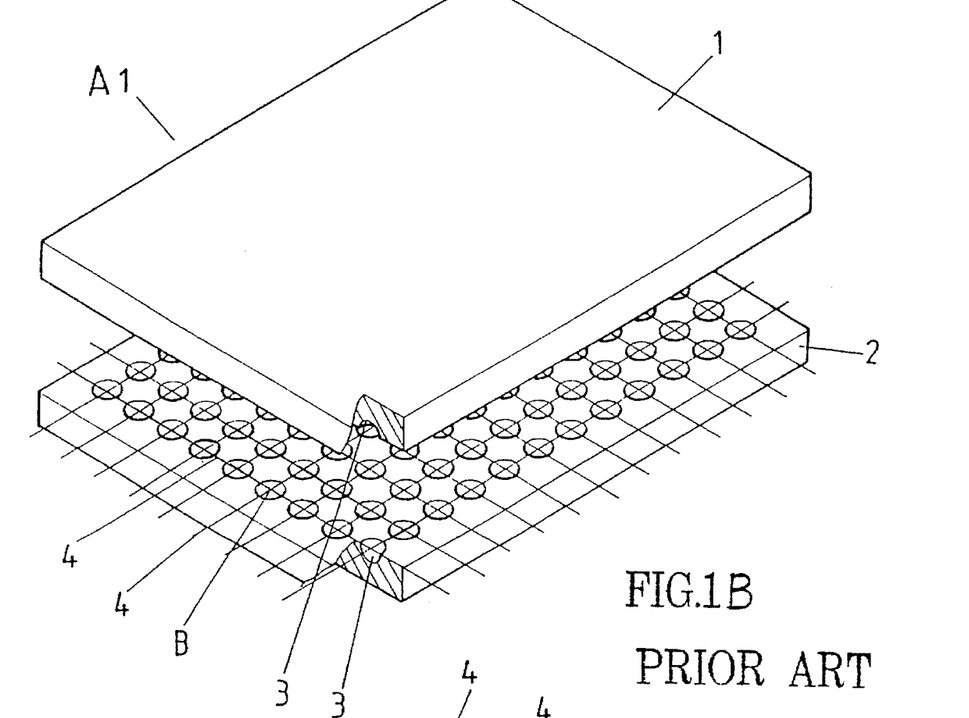
FIG. 1B is a diagrammatic view of the conventional mold and cord laying.
Figure 1C:
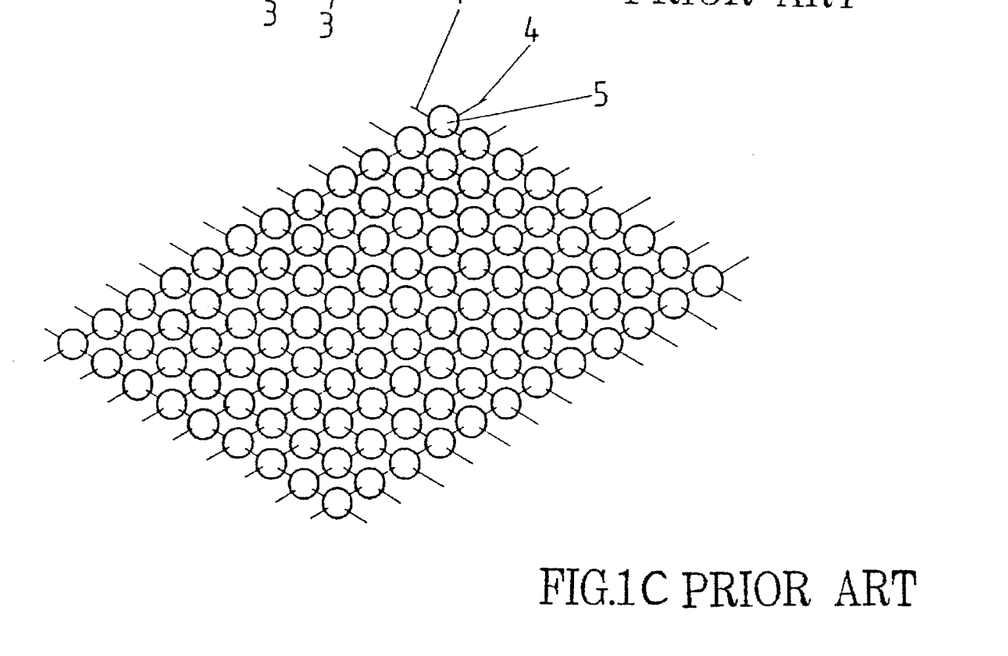
FIG. 1C is a diagrammatic view of the conventional product.

There is also known a ball-type bead-net (FIG. 1C). The known ball-type bead-net is not a kind of sheet material, but is described here in order to show the difference between the conventional sheet material and the present invention. Referring to FIGS. 1A and 1B, there is a conventional mold A1 and a plurality of single-thread cords 4, said mold A2 consisting of upper mold 1 and lower mold 2. Said upper mold 1 and lower mold 2 have symmetrical semi-sphere slots 3. Cords 4 lay on the lower mold 2 in horizonal and longitudinal fashion, enabling the intersecting portions of two cords 4 to lie in slots 3. Plastic material is injected into slots 3 to form ball bodies 5 by an injection forming machine, said ball bodies 5 each wrapping two cords 4. A bead net with upper and lower round projections is formed upon injection, and said bead net is removed. It is understood that the bead net has the following defects:

(1) The cords 4 must be laid and placed in alignment, which causes trouble and wastes time for manufacture. (The process is only slightly faster than ordinary cord weaving.)

(2) The resulting product is only one sheet with a fixed area, length and size. Different specifications require different molds.

(3) The grain of bead must be large as a result of the limitations of manual cord laying, and therefore is not suitable for the manufacture of different kinds of products.

(4) The bead net is suitable for use as chair (seat) cushions, owing to its round projective bottom, but it is not suitable for use as a sheet material.

(5) The structure of single-thread and rough sieves is liable to break.

The inventor has therefore merged the handsome appearance of beads, the permeability of a thread net to allow for smaller bead grains, and semi-sized beads for blending with net cloth fiber into the sieves. The beads are thus integrally molded so as to provide for a number of different products. Particularly, the invention may make sheet materials without limit to the width and length in a quick manner to achieve practical uses and lower the cost of manufacture.

DETAILED DESCRIPTION OF THE PREFERRED EMBODIMENTS

Figure 2A:
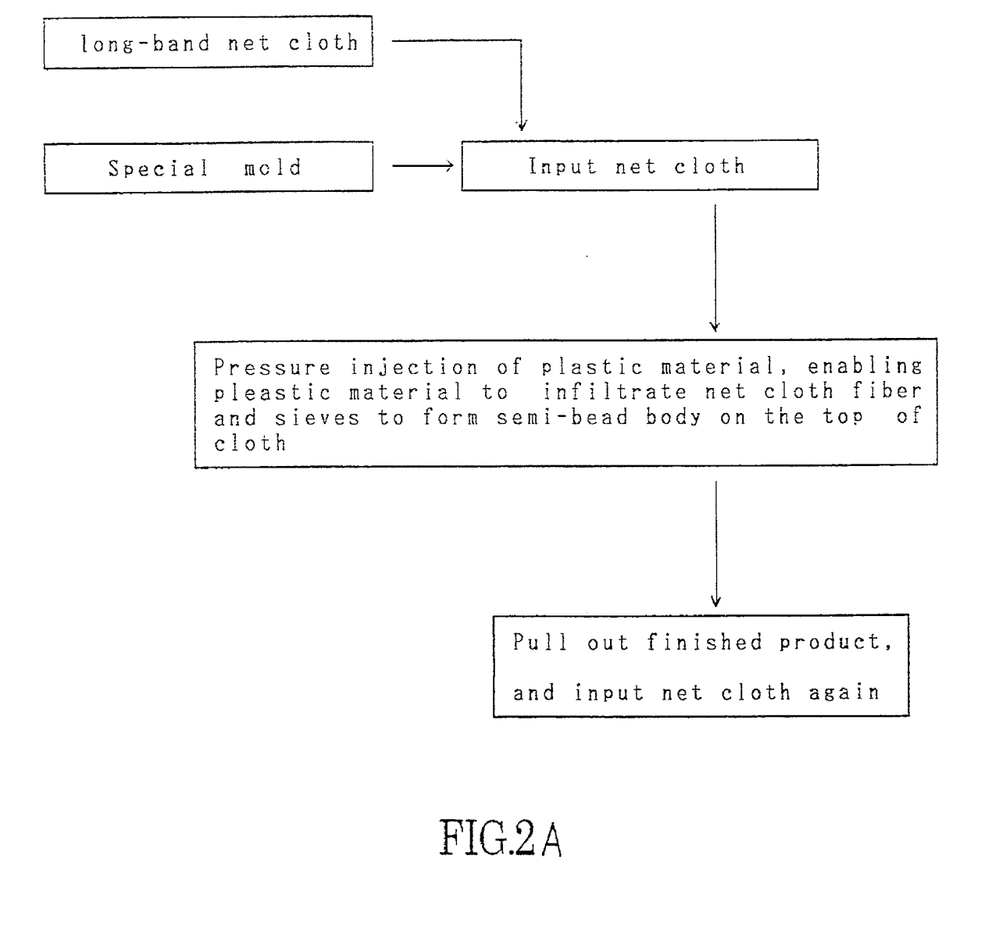
FIG. 2A is a manufacturing process block diagram of the present invention.
Figure 2B:
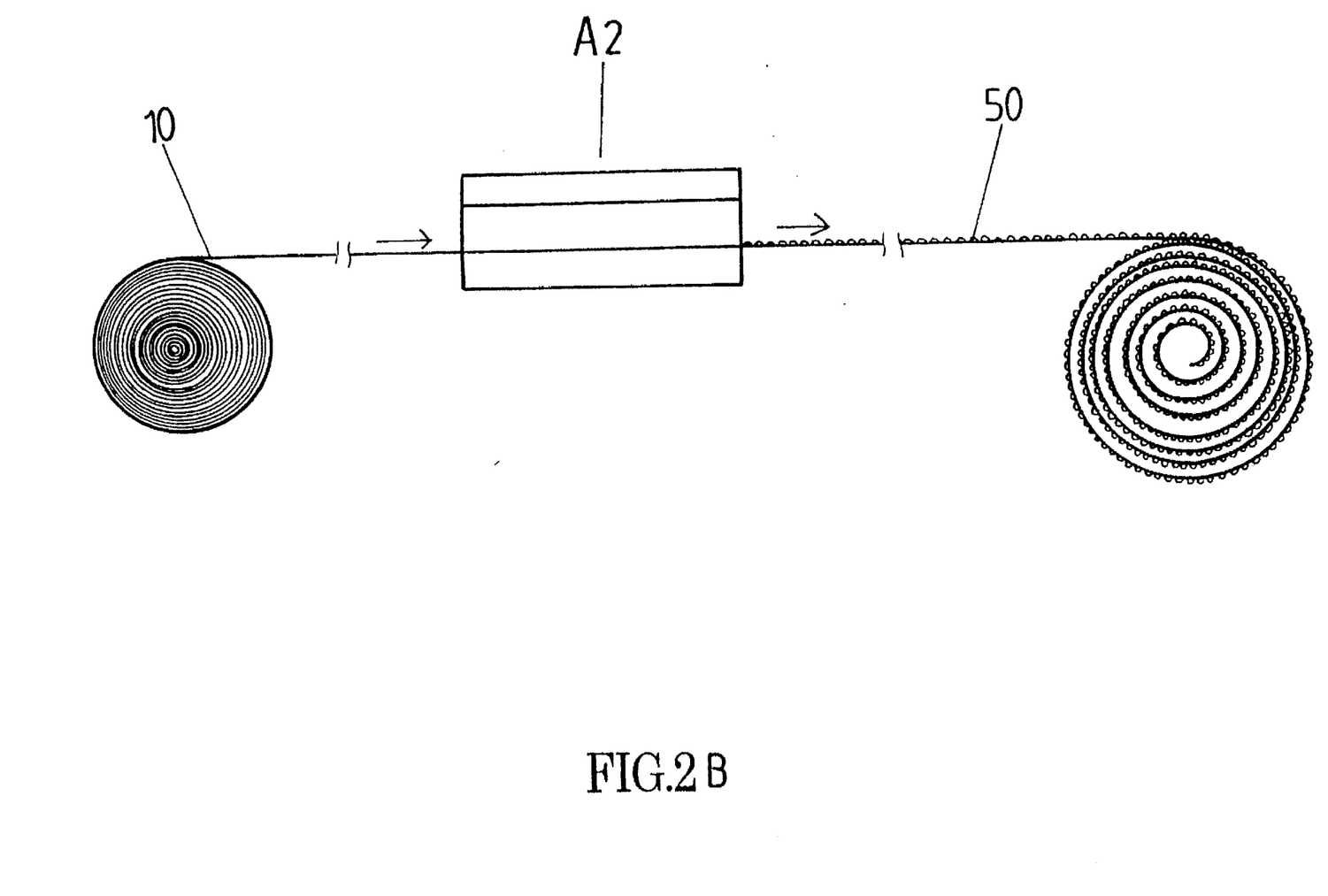
FIG. 2B is a brief diagram of manufacturing process of the present invention.

Referring to FIGS. 2A, 2B, the present invention relates to a net cloth 10 for continuous input in a special mold A2 at setting time to inject small semi-spherical bodies 50 by integral molding.

Figure 3A:
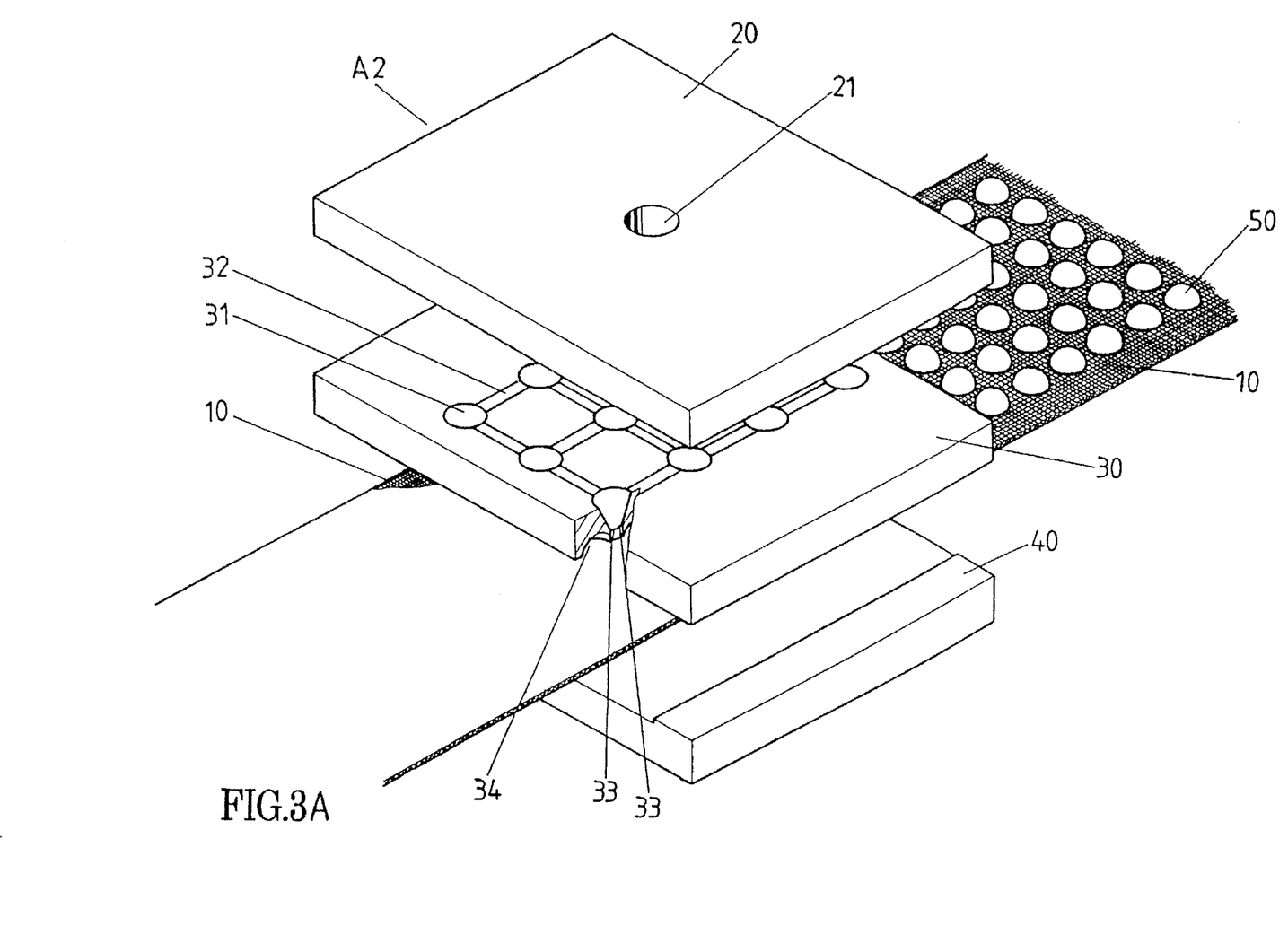
FIG. 3A is a diagrammatic view of the present mold.
Figure 3B:
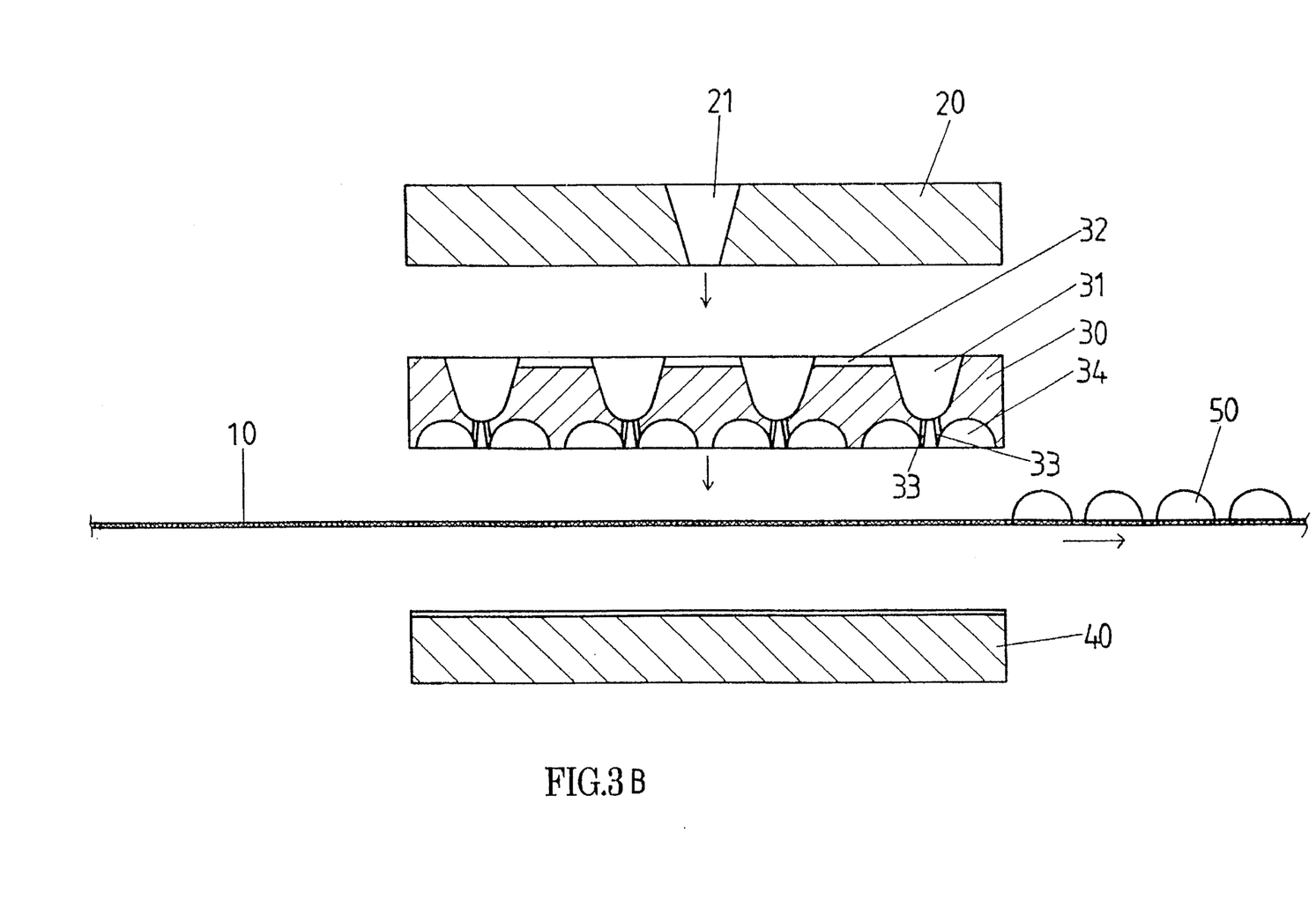
FIG. 3B is a sectional view of the present mold.

1. A net cloth 10 and a special mold A2 are selected. Said net cloth 10 may be a long-band cloth or bundle having sieves formed by fiber. Said special mold A2, referring to FIGS. 3A and 3B, consists of upper, middle and lower molds 20, 30 and 40. Said upper mold 20 has a main feed hole 21, the bottom resembling a flat plate. The front side of the middle mold has a communication feed hole 31, a material placing channel 32, and a semi-round slot 34 on its bottom. There also are branch placing channels 33 between slot 34 and said feed hole 31. Said lower mold 40 also resembles a flat plate, each side providing an open space for the net cloth 10 to move in parallel.

Figures 4A, 4B:
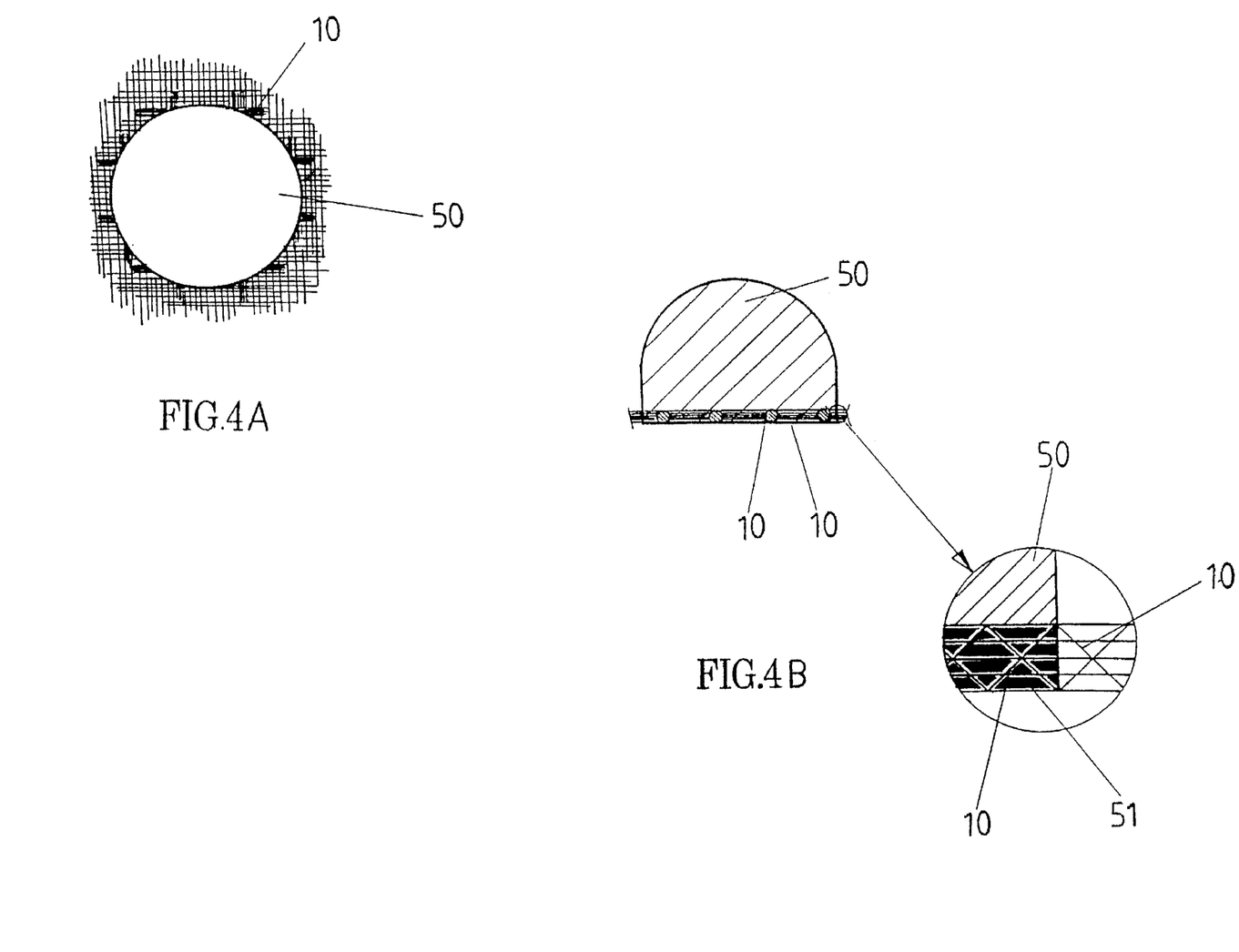
FIG. 4A is a front view of the product.
FIG. 4B is a diagrammatic view of the connection.
Figure 5:
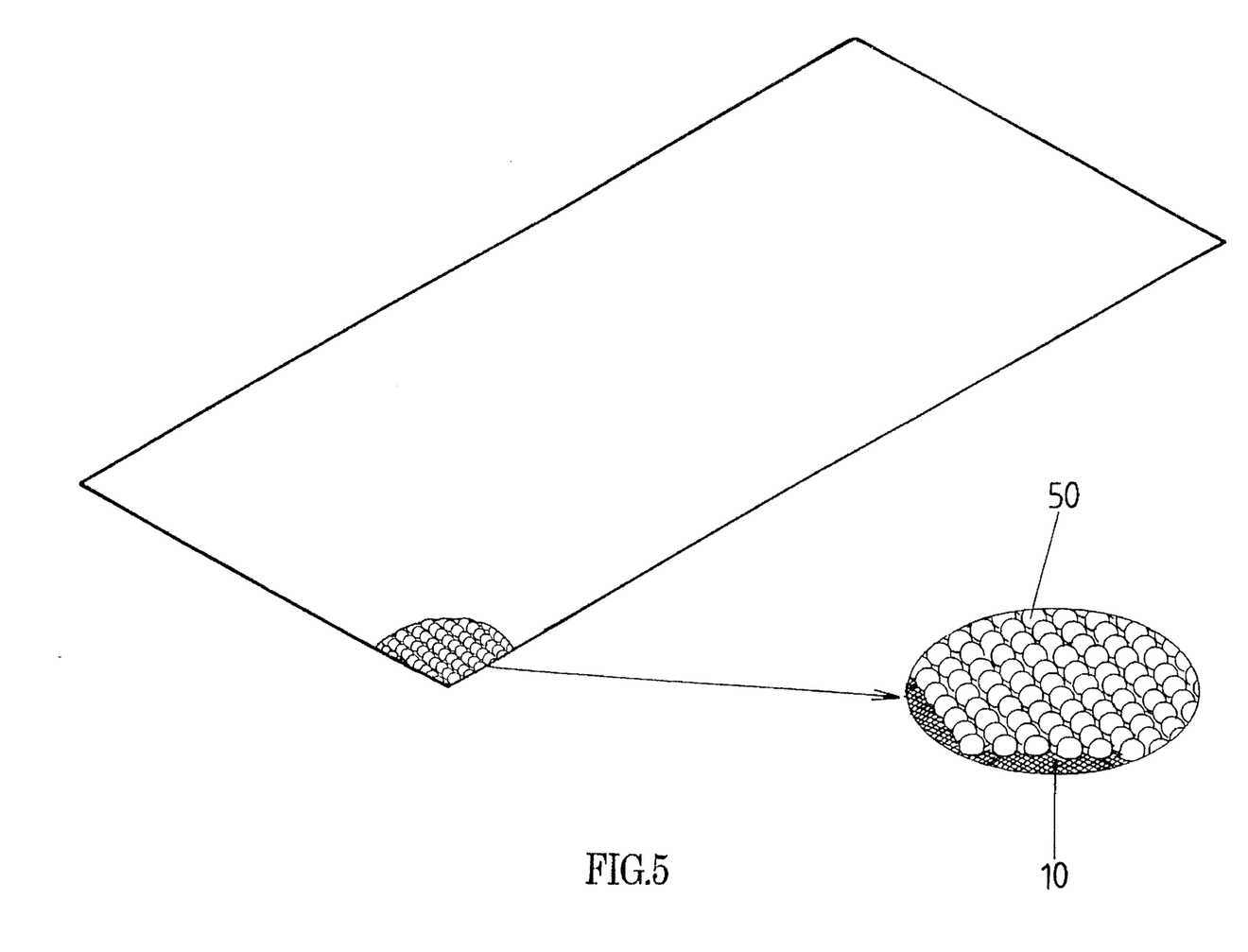
FIG. 5 is a diagrammatic view of the product of the present invention.

2. Pressure injection molding:

The net cloth 10 is placed in between the lower mold 40 and middle mold 30. The upper, middle and lower molds 20, 30, 40 are closed for pressure injection of plastic material, said plastic material infiltrating the fiber and the sieves of the net cloth 10 to form a blend sheet 51, enabling the small semi-bead bodies 50 thus formed to become integrally molded with the net cloth 10 (FIGS. 4A and 4B) to ensure that semi-bead bodies 50 are intensively connected to the net cloth 10.

3. Automatic discharge of finished product and net cloth input:

Mold A2 is opened when said product is formed to let the product eject from the mold in bundle form for storage and to input a further net cloth 10 for another molding in formation. Quick formation of bead-body sheet materials can be thus produced through such cycles.

The characteristics and advantages of the present invention according to the aforesaid statements are as follows:

The invention obviates the necessity of manual cord laying, single-sheet operation and single-sheet manual removal of product, and accomplishes cloth bundle (band) type continuous input in formation, as well as automatic discharge without limit to the length and width of the sheet material.

The invention allows for total automatic net cloth 10 input and product output and results in quick production and therefore reduces time and labor cost.

The conventional sheet material relates to two single-thread wrapping. It is understood that such single-thread wrapping is liable to break, while the present invention relates to multi-thread infiltration blending and integral molding which is stronger and more durable.

The conventional sheet material is only suitable for chair (seat) cushions while the present invention, because of small-grain beads and flat bottom may be suitable for chair (seat) cushions, mats, purses, ornaments, steering wheel covers, sofas, shoe pads, massage covers, and slipper covers. It is also flexible in facility of processing, permeability and grains for giving a massage effect which results in multiple purposes and increased value and use of the resulting product.

The conventional sheet materials are all of the flat type with appearance improved by use of colors. The present invention has small grains distributed all over to form a peadescent effect to enhance the beauty of the product.

What is claimed is:

1. A sheet material having an upper surface and a lower surface comprising a net of fibers having plastic beaded bodies integrally molded therein such that the upper surface of the material has discrete elevated portions and the lower surface of the material is flat.

2. A sheet material according to claim 1 which is flexible.

3. A sheet material according to claim 1 which is permeable.

4. A sheet material according to claim 1 which is flexible and permeable.

5. A sheet material according to claim 1 wherein the fibers are cloth fibers.

6. A sheet material according to claim 1 wherein the elevated portions are rounded.

7. An article of manufacture comprising the sheet material of claim 4 adhered on its flat surface to a substrate.

8. A process for preparing a sheet material having an upper surface and a lower surface comprising a net of fibers having plastic beaded bodies integrally molded therein such that the upper surface of the material has discrete elevated portions and the lower surface of the material is flat, which process comprises:

placing a net of fibers in a mold comprising an upper section having a main feed hole located therein and a flat bottom, a middle section having on its top surface a plurality of feed holes connected one to another by channels and having on its bottom surface a plurality of hemispherical indentations, and a lower section which is flat, wherein the net of fibers is placed between the middle and lower sections;

closing the mold;

injecting a plastic material under pressure through the main feed hole such that the plastic material passes through the feed holes and channels of the middle section to the indentations on its bottom surface, whereby the plastic material infiltrates the net of fibers and forms integrally molded plastic bead bodies on the upper surface of the net of fibers; and releasing the sheet material from the mold.

9. A process according to claim 8 wherein the fibers are cloth fibers.

10. A sheet material prepared by the process of claim 8.

11. A sheet material according to claim 10 which is flexible.

12. A sheet material according to claim 10 which is permeable.

13. A sheet material according to claim 10 which is flexible and permeable.

14. A sheet material according to claim 10 wherein the fibers are cloth fibers.

* * * * *